United States Patent
Mamtimin et al.

(10) Patent No.: US 12,038,551 B2
(45) Date of Patent: Jul. 16, 2024

(54) GAMMA SPECTRAL ANALYSIS

(71) Applicant: HALLIBURTON ENERGY SERVICES, INC., Houston, TX (US)

(72) Inventors: Mayir Mamtimin, Spring, TX (US); Jeffrey James Crawford, Katy, TX (US); Weijun Guo, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 481 days.

(21) Appl. No.: 17/555,018

(22) Filed: Dec. 17, 2021

(65) Prior Publication Data

US 2022/0317330 A1 Oct. 6, 2022

Related U.S. Application Data

(60) Provisional application No. 63/168,723, filed on Mar. 31, 2021.

(51) Int. Cl.
| | |
|---|---|
| *G01V 5/00* | (2024.01) |
| *G01T 1/36* | (2006.01) |
| *G01V 5/06* | (2006.01) |
| *G01V 5/12* | (2006.01) |
| *G06N 20/00* | (2019.01) |

(52) U.S. Cl.
CPC ............... *G01V 5/06* (2013.01); *G01T 1/362* (2013.01); *G01V 5/125* (2013.01); *G06N 20/00* (2019.01); *G06T 2207/20081* (2013.01); *G06T 2207/20084* (2013.01)

(58) Field of Classification Search
CPC .......... G01T 1/362; G01V 5/06; G01V 5/125
See application file for complete search history.

(56) References Cited

U.S. PATENT DOCUMENTS

2018/0225868 A1* 8/2018 Bize .................. G06T 17/05

FOREIGN PATENT DOCUMENTS

| | | |
|---|---|---|
| CN | 111308543 A | 6/2020 |
| EP | 3637150 A1 | 4/2020 |
| WO | 2020239884 A1 | 12/2020 |

OTHER PUBLICATIONS

English abstract of CN111308543; retrieved from www.espacenet.com on Dec. 9, 2021.

* cited by examiner

*Primary Examiner* — Dani Fox
(74) *Attorney, Agent, or Firm* — NOVAK DRUCE CARROLL LLP (57) ABSTRACT

Aspects of the subject technology relate to performing gamma spectral analysis based on machine learning. Gamma spectrum data, which can be associated with a gamma spectrum can be gathered. The gamma spectrum data can include an energy channel and a count rate for gamma rays detected by one or more gamma detectors. A spectral image can be constructed based on the gamma spectrum data. One or more machine learning models can be trained based on the spectral image. Additionally, one or more features of the gamma spectrum can be extracted from the spectral image through the one or more machine learning models.

20 Claims, 8 Drawing Sheets

GAMMA SPECTRAL ANALYSIS

CROSS-REFERENCE TO RELATED APPLICATIONS

This application claims priority to U.S. provisional application No. 63/168,723 filed on Mar. 31, 2021, which is expressly incorporated by reference herein in its entirety.

TECHNICAL FIELD

Various aspects of the subject technology are related to performing gamma spectral analysis through machine learning and, in particular, to performing gamma spectral analysis by applying machine learning to one or more spectral images generated from an analyzed gamma spectrum.

BACKGROUND

In nuclear measurements, gamma detectors are often used to extract both characteristic energies and the intensity of gamma emissions from nuclear interactions of interest. In operation, gamma detectors absorb the incident gamma energy and generate electric pulses from Compton scattering (i.e., scattering of a photon after an interaction with a charged particle), photoelectric, and pair-production mechanisms. In a gamma response, the electric pulse height, e.g. during a pulse mode of operation, corresponds to the gamma energy and the detection rate corresponds to the counting intensity or count rate. In principle, every energy channel and count rates contain useful information that describes specific nuclear interactions.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features of the present disclosure.

As discussed previously, every energy channel and count rates in gamma spectroscopy can provide useful information for gamma spectrum analysis. However, it is challenging to analyze a gamma spectrum when the underlying physics behind the analyzed nuclear interactions is complex. Further, it is challenging to analyze a gamma spectrum when a sampled material contains either or both mixtures of many elements and many different chemical compositions. Specifically, not only is it time-consuming to perform such an analysis but there is also a lack of analytical accuracy in such analysis. In particular, such problems are exacerbated when a human is relied on to perform the analysis.

Further, it is difficult to perform gamma spectral analysis when the entire gamma spectrum has to be factored into the analysis. Due to the inherent interaction complexity and convoluted shape of a gamma spectrum, it is often necessary to analyze the spectrum as a whole vector, fully utilizing the entire spectrum, instead of only focusing on selected or partial energy channels. This is particularly apparent in scenarios where gamma detectors are utilized in downhole tools for characterizing a sub-surface environment. Specifically, a human is often incapable of and analyzing a gamma spectrum as a whole due to the inherent interaction complexity and convoluted shape of the gamma spectrum.

The disclosed technology addresses the foregoing limitations of a conventional method of gamma spectral analysis by performing gamma spectral analysis through machine learning. Specifically, machine learning can be applied to one or more spectral images generated from an analyzed spectrum in order to perform gamma spectral analysis.

Some aspects of the disclosed technology can be utilized in downhole tools for logging while drilling (LWD) applications. However, as will be discussed in further detail, other types of environments including measurement while drilling (MWD) or wireline wellbore environments are similarly applicable.

Figure 1A:
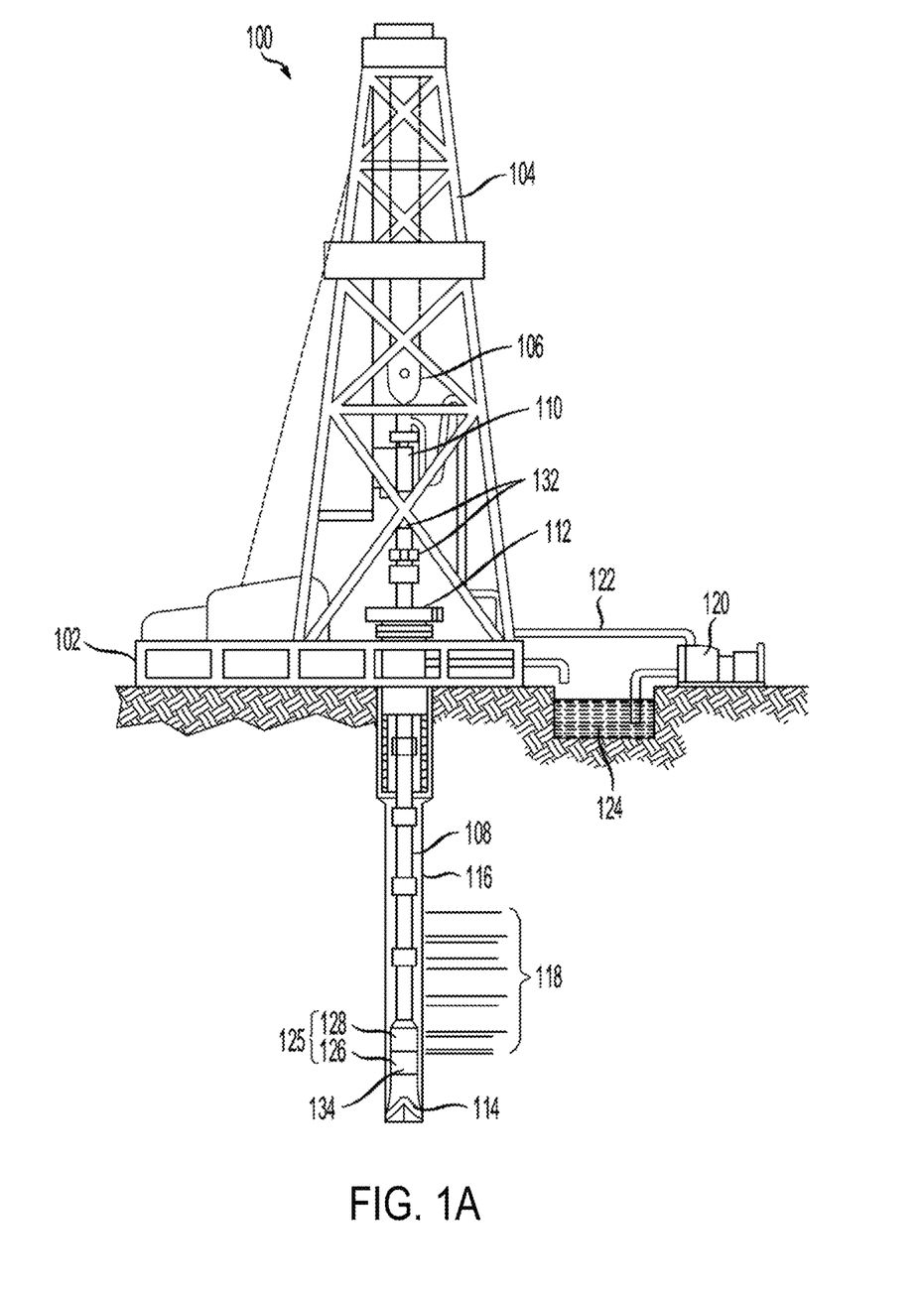
FIG. 1A is a diagram of an example downhole environment, in accordance with various aspects of the subject technology.

Referring to FIG. 1A, a diagrammatic view illustrates an exemplary wellbore drilling environment 100, for example, a logging while drilling (LWD) and/or measurement while drilling (MWD) wellbore environment, in which the present disclosure can be implemented. As illustrated in FIG. 1A, a drilling platform 102 is equipped with a derrick 104 that supports a hoist 106 for raising and lowering one or more drilling components 132 which can include, for example, a drill string 108 which can include one or more drill collars 134, a drill bit 114, and/or a bottom-hole assembly 125. The drilling components 132 are operable to drill a wellbore 116. The drilling components 132 also can include housings for one or more downhole tools. The drilling components 132 can be manufactured from one or more materials including, but not limited to, steel, stainless steel, an alloy, or the like. The material can also be magnetic or non-magnetic.

The hoist 106 suspends a top drive 110 suitable for rotating the drill string 108 and lowering the drill string 108 through a wellhead 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to the top drive 110, down through the interior of the drill string 108, through orifices in the drill bit 114, back to the surface via the annulus around the drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As illustrated in FIG. 1A, sensors 126 can be provided, for example, integrated into the bottom-hole assembly 125 near the drill bit 114. The sensors 126, in another example, can be integrated into a drill collar of a pressure sleeve system. As the drill bit 114 extends the wellbore 116 through the formations 118, the sensors 126 can collect measurements of various drilling parameters, for example relating to various formation properties, the orientation of the drilling component(s) 132, dogleg severity, pressure, temperature, weight on bit, torque on bit, and/or rotations per minute. The sensors 126 can be any suitable sensor to measure the drilling parameters, for example, transducers, fiber optic sensors, and/or surface and/or downhole sensors. The bottom-hole assembly 125 can also include a telemetry sub 128 to transfer measurement data to a surface receiver 130 and to receive commands from the surface. In some examples, the telemetry sub 128 communicates with a surface receiver 130 using mud pulse telemetry. In other examples, the telemetry sub 128 does not communicate with the surface, but rather stores logging data for later retrieval at the surface when the logging assembly is recovered. Notably, one or more of the bottom-hole assembly 125, the sensors 126, and the telemetry sub 128 can also operate using a non-conductive cable (e.g. slickline, etc.) with a local power supply, such as batteries and the like. When employing non-conductive cable, communication can be supported using, for example, wireless protocols (e.g. EM, acoustic, etc.) and/or measurements and logging data can be stored in local memory for subsequent retrieval at the surface.

Each of the sensors 126 can include a plurality of tool components, spaced apart from each other, and communicatively coupled together with one or more wires. The telemetry sub 128 can include wireless telemetry or logging capabilities, or both, such as to transmit information in real time indicative of actual downhole drilling parameters to operators on the surface.

The sensors 126, for example an gamma ray logging tool, can also include one or more computing devices 150 communicatively coupled with one or more of the plurality of drilling components 132. The computing device 150 can be configured to control or monitor the performance of the sensors 126, process logging data, and/or carry out the methods of the present disclosure.

In some examples, one or more of the sensors 126 can communicate with the surface receiver, such as a wired drillpipe. In other cases, the one or more of the sensors 126 can communicate with the surface receiver by wireless signal transmission. In at least some cases, one or more of the sensors 126 can receive electrical power from a wire that extends to the surface, including wires extending through a wired drillpipe. In at least some examples the methods and techniques of the present disclosure can be performed by a controller, for example a computing device, on the surface. In some examples, the controller can be included in and/or communicatively coupled with a surface receiver. For example, the surface receiver of wellbore operating environment 100 at the surface can include one or more of wireless telemetry, processor circuitry, or memory facilities, such as to support substantially real-time processing of data received from one or more of the sensors 126. In some examples, data can be processed at some time subsequent to its collection, wherein the data can be stored on the surface at surface receiver, stored downhole in telemetry sub 128, or both, until it is retrieved for processing.

Figure 1B:
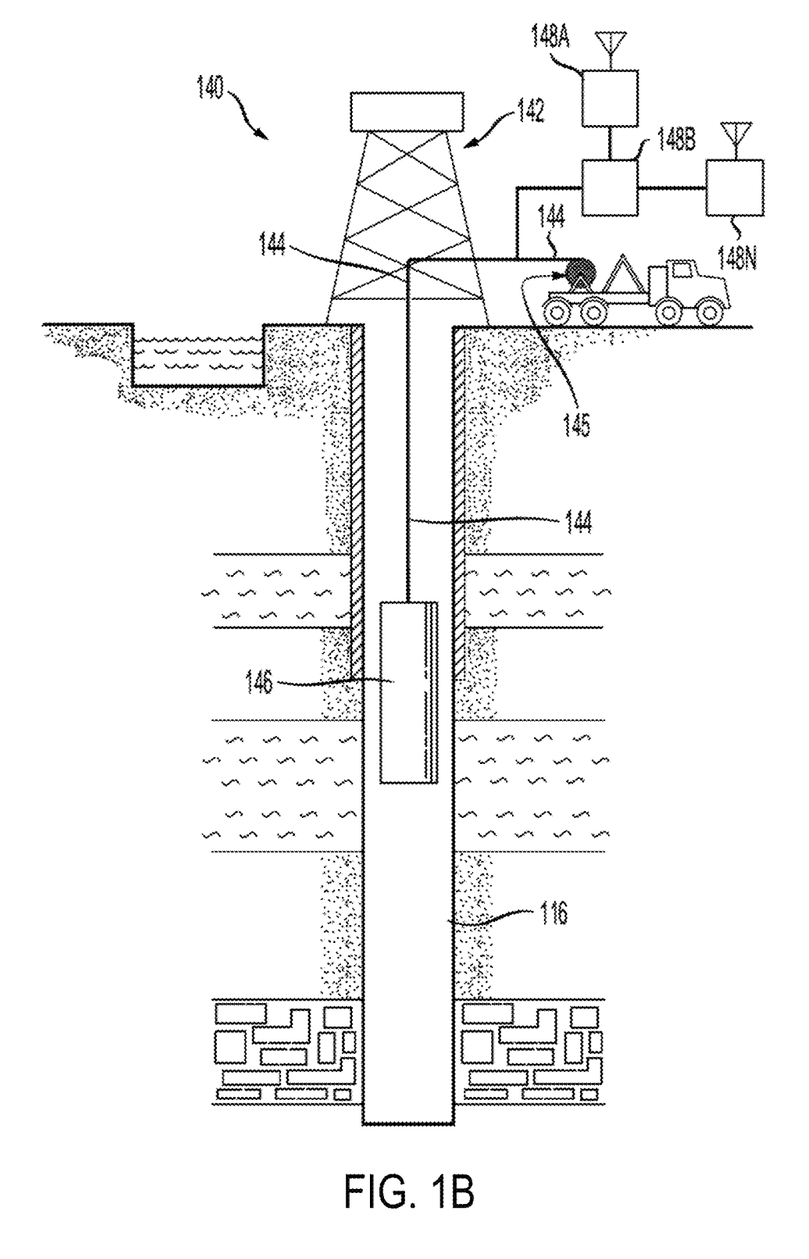
FIG. 1B is a diagram of another example downhole environment, in accordance with various aspects of the subject technology.

Referring to FIG. 1B, an example system 140 for downhole line detection in a downhole environment can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a wireline conveyance 144 can be used. The tool body 146 can include a gamma-ray logging tool. The tool body 146 can be lowered into the wellbore 116 by wireline conveyance 144. The wireline conveyance 144 can be anchored in a drill rig 145 or a portable means such as a truck. The wireline conveyance 144 can include one or more wires, slicklines, cables, and/or the like, as well as tubular conveyances such as coiled tubing, joint tubing, or other tubulars.

The illustrated wireline conveyance 144 provides support for the tool, as well as enabling communication between tool processors 148A-N on the surface and providing a power supply. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

Figure 2:
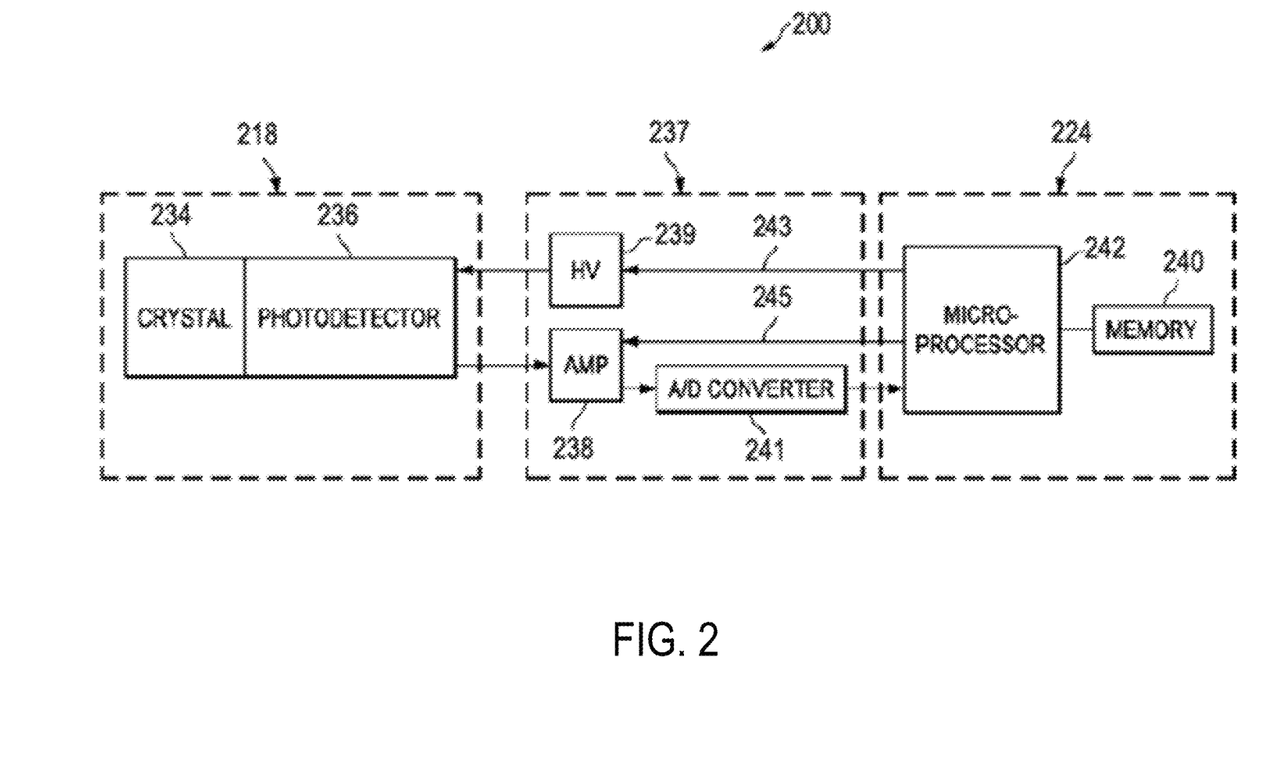
FIG. 2 is a diagram illustrating an example gamma-ray detector system, in accordance with various aspects of the subject technology.

FIG. 2 is a diagram illustrating an example gamma ray detector system 200, in accordance with various aspects of the subject technology. The gamma ray detector system 200 includes a downhole gamma ray detector 218, electronics unit 237, and a processing unit 224. The gamma ray detector 218 may be part of a drilling assembly of a downhole tool for logging while drilling or measuring while drilling operations (see FIG. 1A), or may be a wireline tool for logging an existing well (see FIG. 1B). The gamma ray detector system 200 may include one or more gamma ray detectors 218, e.g., 2, 3, 4, 5, 6, or more. Each gamma ray detector 218 counts gamma ray energy emitted naturally subsurface, but could also be used for other sources of gamma rays in the wellbore. The gamma ray detectors may be near an exterior of the logging tool and be spaced about a circumference. While multiple gamma ray detectors may be included, only one is explicitly presented here.

The one or more gamma ray detectors 218 provide signals that scale the energy deposited by the gamma rays. The gamma ray detector 218 includes one or more scintillator crystals 234 for receiving the gamma rays that then create light emissions that influence an adjacent, optically-coupled photodetector 236, e.g., a photomultiplier tube (PMT). The gamma ray detector 218 is electrically coupled to an electronics unit 237. The electronics unit 237 may include an amplifier 238, a variable high voltage supply unit (i.e., power supply) 239, and an analog-to-digital (A/D) converter 241. The high voltage supply unit 239 is coupled to and powers one or more of the gamma ray detectors 218. One high voltage supply unit (i.e., power supply) 239 may be used to power multiple gamma ray detectors. The high voltage supply unit or units 239 may be configured so that their output voltage can be adjusted by a controller or processor (e.g., microprocessor) 242 as suggested by 243.

The electronics unit 237 may also include the one or more amplifiers 238 to modify the amplitude of the signals coming from the one or more gamma ray detectors 218. The amplifier 238 may be configured to be adjusted by a controller as suggested by 245. Finally, the electronics unit 237 includes the analog-to-digital (A/D) converter 241 to convert voltage signals to digital signals that may be passed to the processing unit 224. The electronics unit 237 is for converting and processing (e.g., adjusting the signal amplitude or adjusting the voltage supplied to the gamma ray detector) the signals including preparing digital signals.

The processing unit 224 includes one or more memories 240 associated with one or more processors, e.g., microprocessor 242. As is well understood, the one or more memories 240 together with the one or more processors 242 are operable to execute code or otherwise accomplish various functions as desired. The processor 242 may be configured to control the output voltage of the one or more variable high-voltage supplies 239 or the one or more amplifiers 238.

In some embodiments, the processing unit 224 may implement a gamma spectral analysis system (not shown in FIG. 2) for the one or more gamma ray detectors 218. The gamma spectral analysis system implemented by the processing unit 224 can gather spectrum data associated with a gamma spectrum. Additionally, the gamma spectral analysis system can construct a spectral image from the gamma spectrum data. Further, the gamma spectral analysis system can extract one or more features of the gamma spectrum from the spectral image through a machine learning technique/model.

Figure 3:
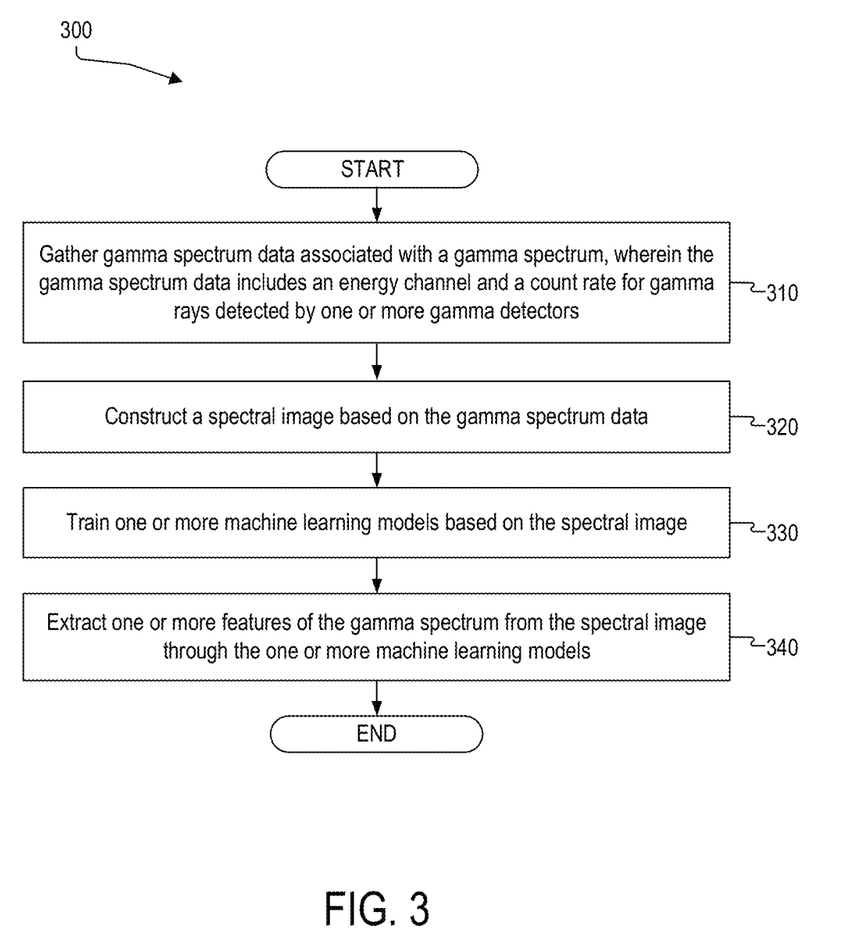
FIG. 3 illustrates a flowchart for an example method of extracting one or more features from a gamma spectrum through machine learning, in accordance with various aspects of the subject technology.

FIG. 3 illustrates a flowchart for an example method 300 of extracting one or more features from a gamma spectrum through machine learning as part of performing gamma spectral analysis, in accordance with various aspects of the subject technology. The method 300 shown in FIG. 3 is provided by way of example, as there are a variety of ways to carry out the method. Additionally, while the example method 300 is illustrated with a particular order of steps, those of ordinary skill in the art will appreciate that FIG. 3 and the modules shown therein can be executed in any order and can include fewer or more modules than illustrated. Each module shown in FIG. 3 represents one or more steps, processes, methods or routines in the method.

At step 310, the method 300 includes gathering gamma spectrum data associated with a gamma spectrum. For example, a gamma spectrum analysis system can gather gamma spectrum data generated by one or more gamma detectors (e.g., one or more gamma detectors 218 as illustrated in FIG. 2). Such gamma spectrum data can be gathered downhole through a downhole tool by one or more gamma detectors. As previously mentioned, the gamma ray detector may be part of a drilling assembly of a downhole tool for logging while drilling, or measuring while drilling operations (see FIG. 1A), or may be a wireline tool for logging an existing well (see FIG. 1B).

In some examples, the gamma spectrum data can include energy channels and a count rate for the gamma rays detected by the gamma detector(s). The count rate represents the number of decays (i.e., counts) recorded each second by the gamma detector(s). For example, the gamma spectrum data can be plotted as a graph as a function of the number of counts (e.g., on the y-axis) vs. energy channel (e.g., on the x-axis) as shown in FIG. 4A.

Figure 4A:
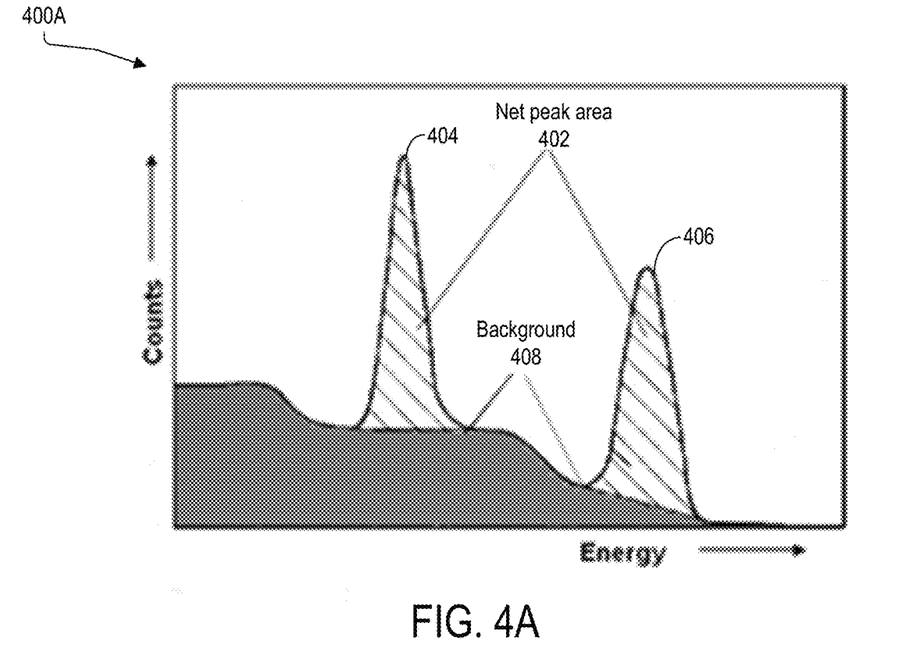
FIG. 4A is a graph of an example gamma spectrum, in accordance with various aspects of the subject technology.

Referring to FIG. 4A, a graph 400A shows an example gamma spectrum that is a plot of the number of counts (e.g., on the y-axis) as a function of energy channel (e.g., on the x-axis), in accordance with various aspects of the subject technology. Gammas that form a gamma spectrum can be emitted when nucleus deexcites from an elevated energy level to a lower state. A nucleus deexcites with characteristic gammas, corresponding to unique gamma energies, due to the quantized energy levels of the nucleus. During this process, a single gamma or a combination of multiple gammas are emitted with corresponding branching ratios or emission probabilities. When a gamma detector (e.g., one or more gamma detectors 218 illustrated in FIG. 2) receives these gammas, a cascade of electric pulses is generated. Depending on the stochastic gamma interaction modes, some pulses correspond to the full energy and others to the partial energy.

Gamma spectrum analysis aims to extract qualitative information corresponding to which nucleus emitted the gamma and quantitative information corresponding to what quantity of a specific nucleus is in a sample. In gamma spectroscopy, a peak (e.g., peaks 404 and 406 illustrated in FIG. 4A) correspond to a specific element and/or its characteristics. Also, a net peak area 402 under gamma peaks 404 and 406, as is shown in FIG. 4A, can be calculated to extract elemental concentration. However, such a calculation becomes difficult to perform when the spectrum contains multiple gammas from various elemental nucleus due to the background counts 408 under the peaks 404 and 406, thereby leading to the previously described deficiencies of increased processing time and reduced accuracy.

Further, detector resolution can blur distinctions between different peaks, thereby further leading to reduced accuracy. Additionally, gamma measurement can suffer from statistical noise, which can lead to reduced accuracy.

Figure 4B:
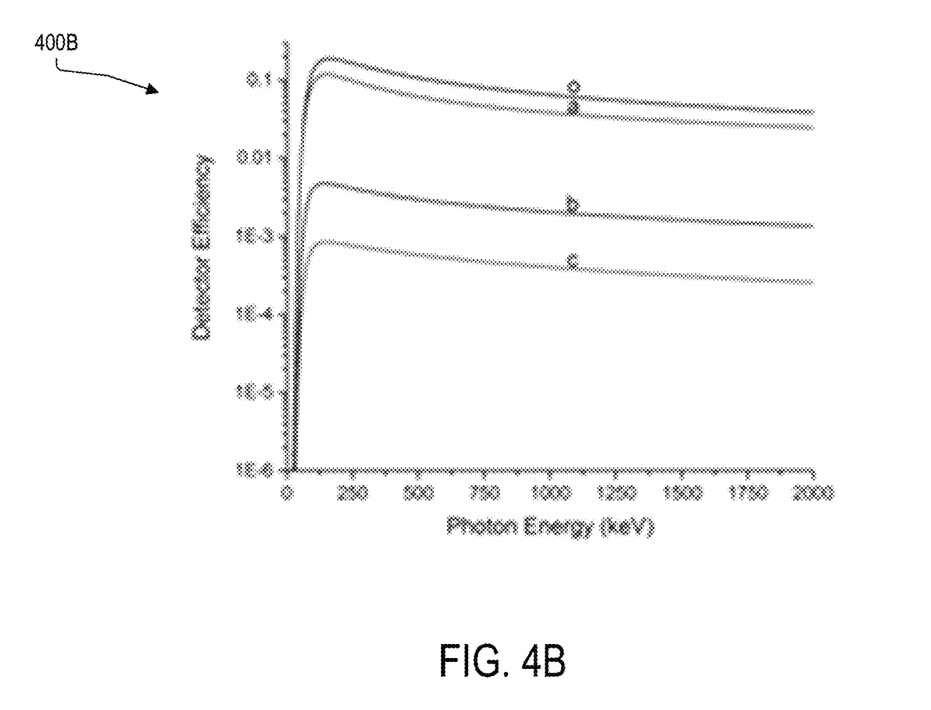
FIG. 4B is a graph of an example detector efficiency, in accordance with various aspects of the subject technology.

Also, the efficiency of the gamma detectors can affect the accuracy of the gamma spectrum data. Referring to FIG. 4B, a graph 400B illustrates an example of detector efficiency (e.g., on the y-axis) as a function of photon energy in keV (e.g., on the x-axis), in accordance with various aspects of the subject technology. Since not all gamma rays emitted by a source can pass through the detector and produce a count, the probability that an emitted gamma-ray will interact with the detector and produce a count can be represented by a detector efficiency.

In addition to the inherent interaction complexity and convoluted shape of the gamma spectrum, due to the above-mentioned limitations that may cause a reduced analytical accuracy, it is vital to analyze the spectrum as a whole vector, fully utilizing the entire spectrum to capture all available indicators, instead of focusing on partial energy channels or energy peaks. To do so, the method 300 includes generating a spectral image based on the spectrum data, which is described in further detail below.

Returning back to the flowchart shown in FIG. 3, at step 320, the method 300 includes constructing a spectral image based on the gamma spectrum data. For example, the gamma spectrum analysis system can construct the spectral image, which may be a digital feature map such as a pixelated image, based on the gamma spectrum data gathered at step 310.

According to some examples, the spectral image is a pixelated image where a location of each pixel corresponds to the energy channel (e.g., energy channel illustrated in the gamma spectrum graph 400A) and a brightness of each pixel corresponds to the count rate (e.g., the number of counts illustrated in the gamma spectrum graph 400A). By reconstructing the gamma spectrum (e.g., energy channel converted into the location of a pixel and the number of counts converted into the brightness of the corresponding pixel), the gamma spectrum can be converted to a digital feature map that can be analyzed using image processing algorithms.

In order to construct the spectral image based on the gamma spectrum data, one or a combination of normalization, background subtraction, reshaping, and pixelated image construction can be performed. Specifically, and potentially based on a type of gamma spectrum analysis that is performed, the gamma spectrum data can be normalized, background subtracted, and reshaped to include derived features in the spectral image. Background subtraction can include, by way of example, one or a combination of binning by energy and detector resolution, normalization by detector efficiency, normalization by Compton continuum, reshaping by mathematical models, and deriving new features based on physics and application.

Figure 5A:
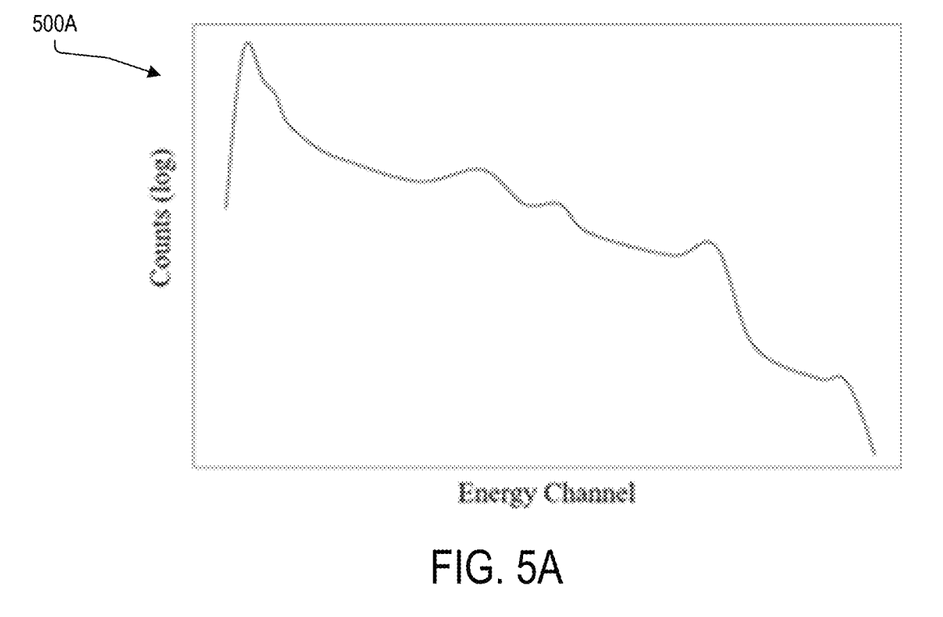
FIG. 5A is a graph of another example gamma spectrum, in accordance with various aspects of the subject technology.

FIG. 5A is a graph 500A of another example gamma spectrum that is a plot of the number of counts (in a logarithmic scale) as a function of energy channels, in accordance with various aspects of the subject technology. In the graph 500A, the number of counts is set to the logarithmic scale on the y-axis. Based on the gamma spectrum graph 400A as shown in FIG. 4A, the number of counts is converted into the logarithmic scale to obtain a log curve, which represents a plot of the number of counts vs. energy channel.

Figure 5B:
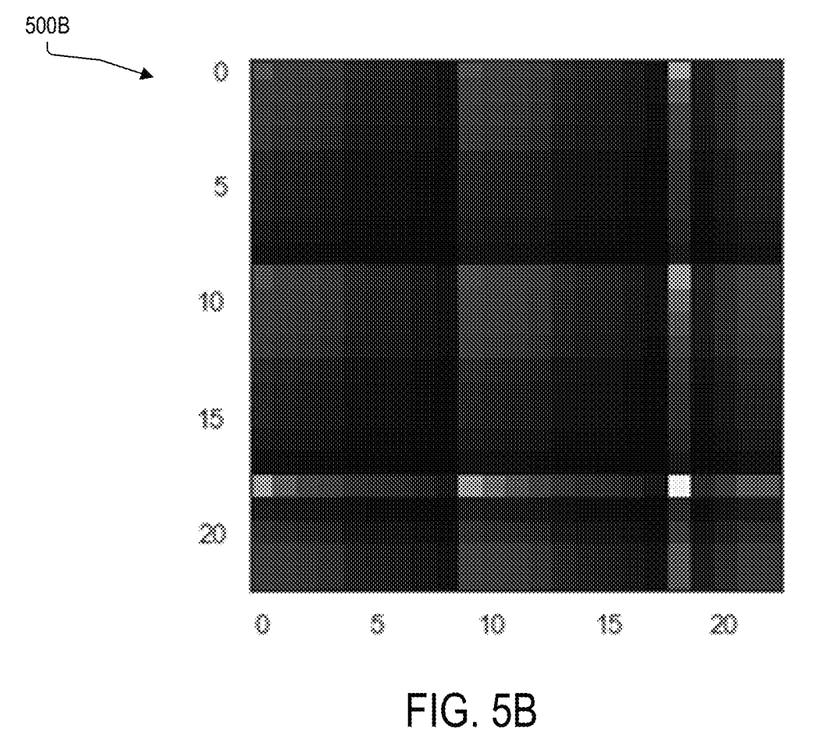
FIG. 5B is an example spectral image generated based on the gamma spectrum shown in FIG. 5A, in accordance with various aspects of the subject technology.

FIG. 5B is an example spectral image 500B generated based on the gamma spectrum shown in FIG. 5A, in accordance with various aspects of the subject technology. In some examples, to generate the spectral image 500B shown in FIG. 5B, a spectral vector with 256 energy channels can be first background subtracted and normalized based on the gamma spectrum data corresponding to the gamma spectrum shown in FIG. 5A. The vector can then be converted to the spectral image. The vector can be further reduced in dimension by energy bins to generate a new vector. The new vector can be expanded with derived features based on the application of analysis.

As shown in FIG. 5B, the vector can be pixelated to construct the pixelated image 500B, for example, in which a location of each pixel corresponds to the energy channel and a brightness of each pixel corresponds to the count rate. While the spectral image 500B (i.e., pixelated image 500B) is 25 pixels by 25 pixels, a spectral image can be formed by any applicable number of elements, e.g., addressable elements.

In a conventional gamma spectrum, various peaks overlap each other, for example, due to mixtures of many elements and many different chemical compositions, and therefore, a difficulty arises as to matching elemental or nuclear properties of the specific element or isotope. The spectral image 500B, on the other hand, can provide a more accurate and less time-consuming spectral analysis based on the digital map per se.

While the example spectral image 500B (i.e., pixelated image 500B) shown in FIG. 5B is formed based on a spectral vector with 256 channels, a spectral vector with applicable characteristics, e.g. an applicable number of channels, can be applied in forming a spectral image.

Returning back to the flowchart shown in FIG. 3, at step 330, the method 300 includes training one or more machine learning models based on the spectral image. For example, the gamma spectrum analysis system can train one or more machine learning models based on the spectral image, which is constructed at step 320.

According to some examples, the one or more machine learning models can be a convolutional neural network (CNN), which is a subcategory of multi-layer perceptron, specifically developed for image analysis. In training the convolutional neural network, a spectral image with dimension or resolution by addressable element can be served as input. Additionally, brightness ranges, e.g., from 0-255, of each addressable element within the spectral image can serve as input. In various embodiments, brightness levels for a red channel, a green channel, and a blue channel (i.e., RGB channels) at each addressable element can serve as input.

Convolution can be a dot product of a kernel, or a filter, and a patch of an image. A patch of an image can be a local receptive field of the same size as the image. A kernel can define what type of pattern or signal to extract from each receptive field in identifying features of a gamma spectrum.

In some examples, the training of the machine learning model (e.g., convolutional neural network) can include applying a convolutional layer to the spectral image. A convolutional layer can be constructed and applied to all or a portion of the spectral image. Specifically, a convolutional layer can be applied to extract local features of a gamma spectrum from the spectral image, for example, based on neighboring energy channels, neighboring gamma peaks, or neighboring pixels.

Furthermore, the training of the machine learning model (e.g., convolutional neural network) can include applying a pooling layer to the spectral image. A pooling layer can also be constructed and applied to all or a portion of the spectral image. Specifically, a pooling layer can be applied to extract global features of a gamma spectrum from the spectral image, for example, based on the entire spectral image (i.e., the spectral image as a whole).

In some examples, the pooling layer can be applied to the spectral image after the convolutional layer is applied to the spectral image. Specifically, convolutional layer(s) can be applied to extract patterns and details from neighboring pixels or channels in the spectral image. Subsequently, pooling layer(s) can be applied to extract more dynamic features from the entire spectral image. By repeating application of convolutional layer(s) and pooling layer(s), a fully connected neural network for final quantitative, regression, or qualitative, classification, analysis can be generated.

At step 340, the method 300 includes extracting one or more features of the gamma spectrum from the spectral image through the one or more machine learning models. Any applicable machine learning techniques/models can be applied in extracting the one or more features of the gamma spectrum from the spectral image. Specifically, one or more models can be applied in extracting the one or more features from the spectral image. More specifically, one or more convolutional neural networks can be applied in extracting the one or more features from the spectral image. Extracted features of the gamma spectrum can include applicable features of a gamma spectrum that can be extracted for performing spectral analysis. In some examples, the extracted features can include an elemental concentration of a sample area.

In some examples, machine learning models applied in extracting the one or more features can be trained using one or a combination of simulated gamma spectrum data, test gamma spectrum data, and historical gamma spectrum data. For example, the model can be trained based on gamma spectrum data that is gathered by generated a gamma spectrum response on a test machine.

According to some examples, the extracting of the one or more features of the gamma spectrum from the spectral image can include extracting local features of the gamma spectrum from the spectral image, extracting global features of the gamma spectrum from the spectral image, and identifying the one or more features of the gamma spectrum based on the local features and/or the global features of the gamma spectrum. For example, not only individual gamma peaks are identified, but also overall spectral shape can be extracted for full scale analysis.

Local features include applicable features that occur in portions of a corresponding gamma spectrum of a spectral image such as gamma peaks in a gamma spectrum. For example, a convolutional layer can be applied to a spectral image to extract local features of the gamma spectrum based on neighboring features (e.g., neighboring energy channels, neighboring gamma peaks, or neighboring pixels).

Global features include applicable features that occur across a corresponding gamma spectrum of a spectral image. For example, a pooling layer can be applied to a spectral image to extract global/dynamic features, such as a relative correlation between different gamma peaks and a slope of the gamma spectrum based on the entire spectral image (i.e., the spectral image as a whole).

Furthermore, the method 300 can perform a gamma spectrum analysis based on the one or more features extracted at step 340. Characteristics of extracted features can vary across application and depend ultimately on a specific type of spectral analysis that is ultimately performed based on the extracted features. For example, features can be extracted at a resolution that facilitates performance a specific type of spectral analysis.

Examples of gamma spectrum analyses that can be performed using the subject technology include an elemental and isotopic analysis, an environmental radiation monitoring analysis, a nuclear nonproliferation analysis, a nuclear well logging analysis, a capture spectral analysis, an inelastic spectral analysis, a ratio-based saturation analysis, a ratio-based holdup analysis, a yield-based saturation analysis, a yield-based holdup analysis, a natural gamma spectral analysis, a gamma-gamma density measurement analysis, and a neutron-gamma density measurement analysis.

Figure 6:
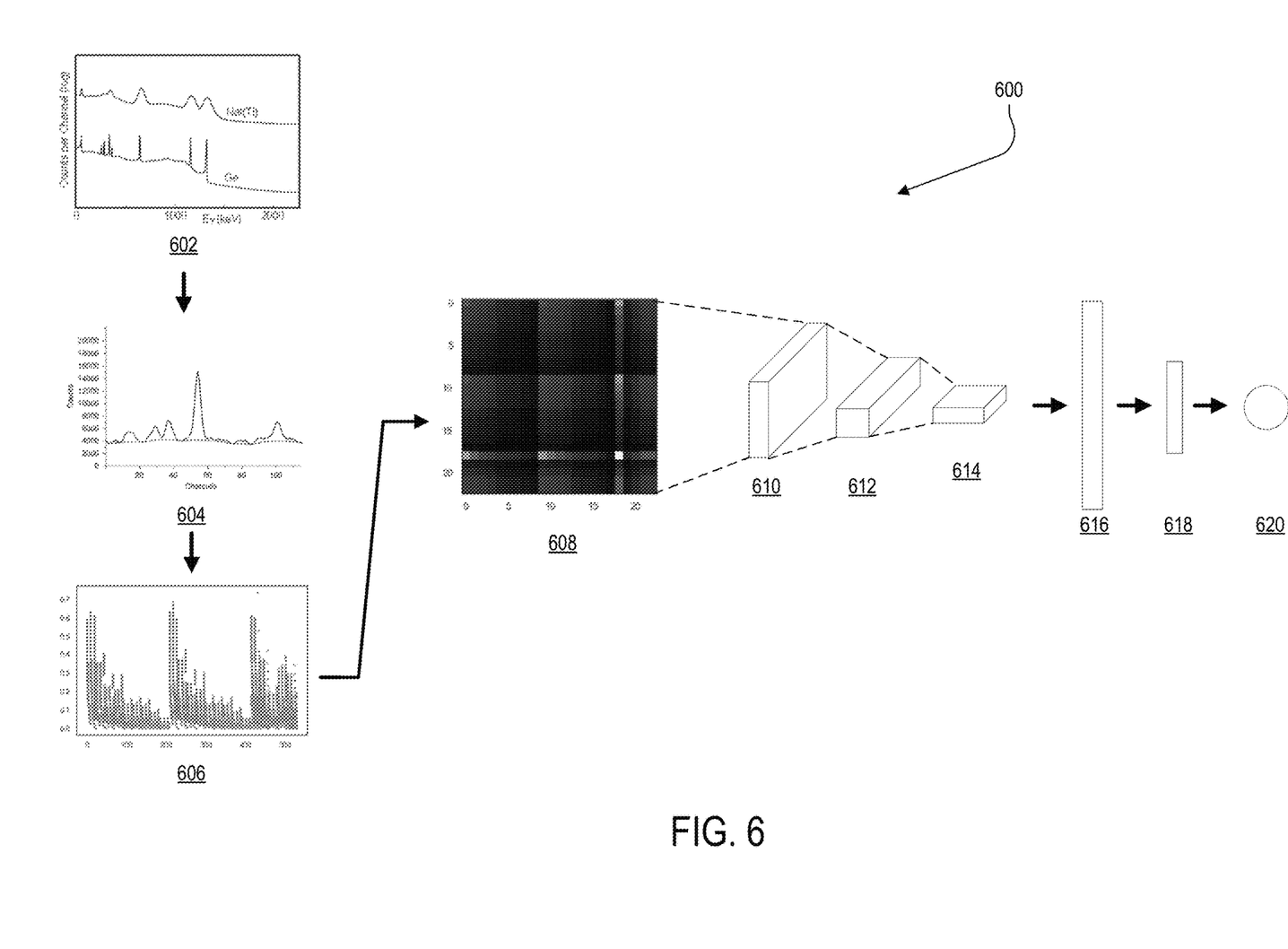
FIG. 6 is a flow of an example technique for identifying one or more features of a gamma spectrum through a spectral image, in accordance with various aspects of the subject technology.

FIG. 6 is a flow of an example technique for identifying features of a gamma spectrum through a spectral image, in accordance with various aspects of the subject technology. At step 602, raw gamma spectrum can be provided. For example, a gamma spectrum analysis system can receive the raw gamma spectrum or gather gamma spectrum data associated with the raw gamma spectrum. The raw gamma spectrum (e.g., the gamma spectrum graph 400A illustrated in FIG. 4A or the gamma spectrum graph 500A illustrated in FIG. 5A) can provide gamma spectrum data such as counts per channel (e.g., count rates) and corresponding energy channels.

At step 604, the raw gamma spectrum can be normalized and background subtracted. The background subtraction can separate foreground elements out from the background so that the background (e.g., noise) can be eliminated from the image.

At step 606, an expanded feature vector can be reshaped. More specifically, an expanded feature vector corresponding to environmental features associated with the gathering of the gamma spectrum data can be reshaped. Environmental features, as used herein, include applicable features associated with a generated gamma spectrum. Specifically, environmental features include applicable features present in the environment during the process of acquiring gamma spectrum data through one or more gamma detectors to generate a gamma spectrum. For example, environmental features can include a size of a borehole in which gamma spectrum data is gathered to generate a gamma spectrum. Examples of environmental features can further include a casing size of a casing lining the borehole, a tool standoff, porosity of a surrounding formation, oil saturation of the surrounding formation, and lithology of the surrounding formation.

At step 608, a spectral image (e.g., pixelated image 500B illustrated in FIG. 5B) can be constructed. For example, the spectral image can be a pixelated image where a location of each pixel corresponds to the energy channel and a brightness (i.e., intensity) of each pixel corresponds to the count rate. The pixelated image can be based on a spectral vector with 256 channels or a spectral vector with applicable characteristics, e.g. an applicable number of channels.

At steps 610, 612, and 614, the spectral image can be applied as input for one or more machine learning models. For example, the spectral image (e.g., pixelated image 500B illustrated in FIG. 5B) can be used as input for a convolutional neural network where convolutional layer(s) and pooling layer(s) are repeatedly applied to extract local and global features, respectively, from the spectral image.

At steps 616 and 618, such layers (e.g., convolutional layer(s) and pooling layer(s) of the convolutional neural network) can be fully connected. At step 620, fully connected layers from steps 616 and 618 can be treated with regularization (e.g., dropout) to yield a final output of interest.

Example advantages of the gamma spectrum analysis system and method described above can provide the following advantages compared to currently available systems and methods. For example, the gamma spectrum analysis of the present disclosure can improve accuracy without data loss. The present disclosure can be also versatile for any spectral analysis based on application. As previously described, example spectral analyses that can be performed using the present disclosure include but are not limited to, an elemental and isotopic analysis, an environmental radiation monitoring analysis, a nuclear nonproliferation analysis, a nuclear well logging analysis, a capture spectral analysis, an inelastic spectral analysis, a ratio-based saturation analysis, a ratio-based holdup analysis, a yield-based saturation analysis, a yield-based holdup analysis, a natural gamma spectral analysis, a gamma-gamma density measurement analysis, and a neutron-gamma density measurement analysis.

Figure 7:
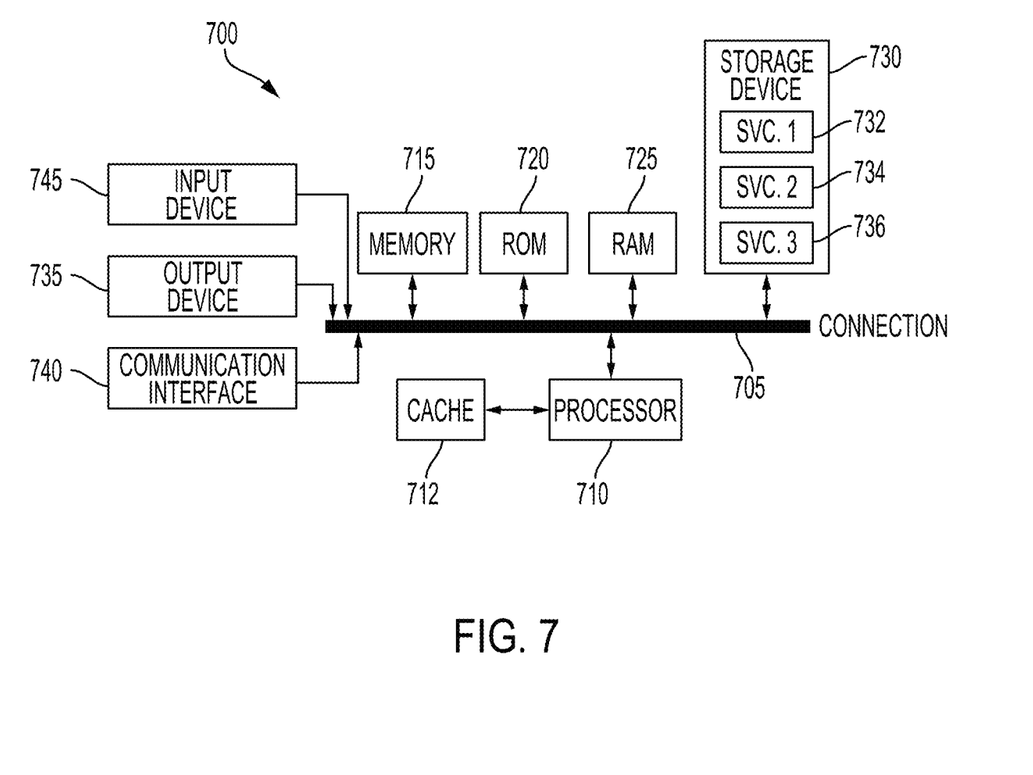
FIG. 7 is a schematic diagram of an example computing device architecture, in accordance with some examples.

FIG. 7 illustrates an example computing device architecture 700 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 7 illustrates an example computing device architecture 700 of a computing device which can implement the various technologies and techniques described herein. For example, the computing device architecture 700 can implement a gain control system or control system. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

The disclosures shown and described above are only examples. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the appended claims.

Statements of the disclosure include:

Statement 1. A method comprising: gathering gamma spectrum data associated with a gamma spectrum, wherein the gamma spectrum data includes an energy channel and a count rate for gamma rays detected by one or more gamma detectors; constructing a spectral image based on the gamma spectrum data; training one or more machine learning models based on the spectral image; and extracting one or more features of the gamma spectrum from the spectral image through the one or more machine learning models.

Statement 2. The method of Aspect 1, wherein the gamma spectrum data is gathered downhole through a downhole tool.

Statement 3. The method of any of Aspects 1 to 2, wherein the spectral image is a pixelated image, wherein a location of a pixel corresponds to the energy channel and a brightness of the pixel corresponds to the count rate.

Statement 4. The method of any of Aspects 1 to 3, wherein the one or more machine learning models is a convolutional neural network.

Statement 5. The method of any of Aspects 1 to 4, wherein the training the one or more machine learning models includes: applying a convolutional layer to the spectral image to extract local features of the gamma spectrum; and applying a pooling layer to the spectral image to extract global features of the gamma spectrum.

Statement 6. The method of any of Aspects 1 to 5, wherein the extracting the one or more features of the gamma spectrum from the spectral image through the one or more machine learning models comprises: extracting local features of the gamma spectrum from the spectral image; extracting global features of the gamma spectrum from the spectral image; and identifying the one or more features of the gamma spectrum based on both the local features of the gamma spectrum and the global features of the gamma spectrum.

Statement 7. The method of any of Aspects 1 to 6, wherein the gamma spectrum data is generated from one or more of simulated gamma spectrum data, test gamma spectrum data, and historical gamma spectrum data.

Statement 8. The method of any of Aspects 1 to 7, wherein the spectral image is constructed based on environmental features associated with the gamma spectrum.

Statement 9. The method of any of Aspects 1 to 8, further comprising: performing a gamma spectrum analysis based on the one or more features.

Statement 10. The method of any of Aspects 1 to 9, wherein the gamma spectrum analysis includes one of an elemental and isotopic analysis, an environmental radiation monitoring analysis, a nuclear nonproliferation analysis, a nuclear well logging analysis, a capture spectral analysis, an inelastic spectral analysis, a ratio-based saturation analysis, a ratio-based holdup analysis, a yield-based saturation analysis, a yield-based holdup analysis, a natural gamma spectral analysis, a gamma-gamma density measurement analysis, and a neutron-gamma density measurement analysis.

Statement 11. A system comprising one or more processors and at least one computer-readable storage medium having stored therein instructions. The instructions, when executed by the one or more processors, cause the one or more processors to: gather gamma spectrum data associated with a gamma spectrum, wherein the gamma spectrum data includes an energy channel and a count rate for gamma rays detected by one or more gamma detectors; construct a spectral image based on the gamma spectrum data; train one or more machine learning models based on the spectral image; and extract one or more features of the gamma spectrum from the spectral image through the one or more machine learning models.

Statement 12. The system of Aspect 11, wherein the gamma spectrum data is gathered downhole through a downhole tool.

Statement 13. The system of any of Aspects 11 to 12, wherein the spectral image is a pixelated image, wherein a location of a pixel corresponds to the energy channel and a brightness of the pixel corresponds to the count rate.

Statement 14. The system of any of Aspects 11 to 13, wherein the one or more machine learning models is a convolutional neural network.

Statement 15. The system of any of Aspects 11 to 14, wherein the instructions to train the one or more machine learning models include the instructions which, when executed by the one or more processors, cause the one or more processors to: apply a convolutional layer to the spectral image to extract local features of the gamma spectrum; and apply a pooling layer to the spectral image to extract global features of the gamma spectrum.

Statement 16. The system of any of Aspects 11 to 15, wherein the instructions to extract the one or more features of the gamma spectrum from the spectral image through the one or more machine learning models include the instructions which, when executed by the one or more processors, cause the one or more processors to: extract local features of the gamma spectrum from the spectral image; extract global features of the gamma spectrum from the spectral image; and identify the one or more features of the gamma spectrum based on both the local features of the gamma spectrum and the global features of the gamma spectrum.

Statement 17. The system of any of Aspects 11 to 16, wherein the gamma spectrum data is generated from one or more of simulated gamma spectrum data, test gamma spectrum data, and historical gamma spectrum data.

Statement 18. The system of any of Aspects 11 to 17, wherein the spectral image is constructed based on environmental features associated with the gamma spectrum.

Statement 19. The system of any of Aspects 11 to 18, wherein the instructions which, when executed by the one or more processors, further cause the one or more processors to: perform a gamma spectrum analysis based on the one or more features.

Statement 20. The system of any of Aspects 11 to 19, wherein the gamma spectrum analysis includes one of an elemental and isotopic analysis, an environmental radiation monitoring analysis, a nuclear nonproliferation analysis, a nuclear well logging analysis, a capture spectral analysis, an inelastic spectral analysis, a ratio-based saturation analysis, a ratio-based holdup analysis, a yield-based saturation analysis, a yield-based holdup analysis, a natural gamma spectral analysis, a gamma-gamma density measurement analysis, and a neutron-gamma density measurement analysis.

Statement 21. A non-transitory computer-readable storage medium having stored therein instructions which, when executed by one or more processors, cause the one or more processors to: gather gamma spectrum data associated with a gamma spectrum, wherein the gamma spectrum data includes an energy channel and a count rate for gamma rays detected by one or more gamma detectors; construct a spectral image based on the gamma spectrum data; train one or more machine learning models based on the spectral image; and extract one or more features of the gamma spectrum from the spectral image through the one or more machine learning models.

Statement 22. The computer-readable storage medium of Aspect 21, wherein the gamma spectrum data is gathered downhole through a downhole tool.

Statement 23. The computer-readable storage medium of any of Aspects 21 to 22, wherein the spectral image is a pixelated image, wherein a location of a pixel corresponds to the energy channel and a brightness of the pixel corresponds to the count rate.

Statement 24. The computer-readable storage medium of any of Aspects 21 to 23, wherein the one or more machine learning models is a convolutional neural network.

Statement 25. The computer-readable storage medium of any of Aspects 21 to 24, wherein the instructions to train the one or more machine learning models include the instructions which, when executed by the one or more processors, cause the one or more processors to: apply a convolutional layer to the spectral image to extract local features of the gamma spectrum; and apply a pooling layer to the spectral image to extract global features of the gamma spectrum.

Statement 26. The computer-readable storage medium of any of Aspects 21 to 25, wherein the instructions to extract the one or more features of the gamma spectrum from the spectral image through the one or more machine learning models include the instructions which, when executed by the one or more processors, cause the one or more processors to: extract local features of the gamma spectrum from the spectral image; extract global features of the gamma spectrum from the spectral image; and identify the one or more features of the gamma spectrum based on both the local features of the gamma spectrum and the global features of the gamma spectrum.

Statement 27. The computer-readable storage medium of any of Aspects 21 to 26, wherein the gamma spectrum data is generated from one or more of simulated gamma spectrum data, test gamma spectrum data, and historical gamma spectrum data.

Statement 28. The computer-readable storage medium of any of Aspects 21 to 27, wherein the spectral image is constructed based on environmental features associated with the gamma spectrum.

Statement 29. The computer-readable storage medium of any of Aspects 21 to 28, wherein the instructions which, when executed by the one or more processors, further cause the one or more processors to: perform a gamma spectrum analysis based on the one or more features.

Statement 30. The computer-readable storage medium of any of Aspects 21 to 29, wherein the gamma spectrum analysis includes one of an elemental and isotopic analysis, an environmental radiation monitoring analysis, a nuclear nonproliferation analysis, a nuclear well logging analysis, a capture spectral analysis, an inelastic spectral analysis, a ratio-based saturation analysis, a ratio-based holdup analysis, a yield-based saturation analysis, a yield-based holdup analysis, a natural gamma spectral analysis, a gamma-gamma density measurement analysis, and a neutron-gamma density measurement analysis.

What is claimed is:

1. A method comprising:
    gathering gamma spectrum data associated with a gamma spectrum, wherein the gamma spectrum data includes an energy channel and a count rate for gamma rays detected by one or more gamma detectors;
    constructing a spectral image based on the gamma spectrum data; training one or more machine learning models based on the spectral image; and
    extracting one or more features of the gamma spectrum from the spectral image through the one or more machine learning models.

2. The method of claim 1, wherein the gamma spectrum data is gathered downhole through a downhole tool.

3. The method of claim 1, wherein the spectral image is a pixelated image, wherein a location of a pixel corresponds to the energy channel and a brightness of the pixel corresponds to the count rate.

4. The method of claim 1, wherein the one or more machine learning models is a convolutional neural network.

5. The method of claim 4, wherein the training the one or more machine learning models includes:
    applying a convolutional layer to the spectral image to extract local features of the gamma spectrum; and
    applying a pooling layer to the spectral image to extract global features of the gamma spectrum.

6. The method of claim 1, wherein the extracting the one or more features of the gamma spectrum from the spectral image through the one or more machine learning models comprises:
    extracting local features of the gamma spectrum from the spectral image;
    extracting global features of the gamma spectrum from the spectral image; and
    identifying the one or more features of the gamma spectrum based on both the local features of the gamma spectrum and the global features of the gamma spectrum.

7. The method of claim 1, wherein the gamma spectrum data is generated from one or more of simulated gamma spectrum data, test gamma spectrum data, and historical gamma spectrum data.

8. The method of claim 1, wherein the spectral image is constructed based on environmental features associated with the gamma spectrum.

9. The method of claim 1, further comprising:
    performing a gamma spectrum analysis based on the one or more features.

10. The method of claim 9, wherein the gamma spectrum analysis includes one of an elemental and isotopic analysis, an environmental radiation monitoring analysis, a nuclear nonproliferation analysis, a nuclear well logging analysis, a capture spectral analysis, an inelastic spectral analysis, a ratio-based saturation analysis, a ratio-based holdup analysis, a yield-based saturation analysis, a yield-based holdup analysis, a natural gamma spectral analysis, a gamma-gamma density measurement analysis, and a neutron-gamma density measurement analysis.

11. A system comprising:
    one or more processors; and at least one computer-readable storage medium having stored therein instructions which, when executed by the one or more processors, cause the one or more processors to:
- gather gamma spectrum data associated with a gamma spectrum, wherein the gamma spectrum data includes an energy channel and a count rate for gamma rays detected by one or more gamma detectors;
- construct a spectral image based on the gamma spectrum data;
- train one or more machine learning models based on the spectral image; and
- extract one or more features of the gamma spectrum from the spectral image through the one or more machine learning models.

12. The system of claim 11, wherein the spectral image is a pixelated image, wherein a location of a pixel corresponds to the energy channel and a brightness of the pixel corresponds to the count rate.

13. The system of claim 11, wherein the one or more machine learning models is a convolutional neural network.

14. The system of claim 13, wherein the instructions to train the one or more machine learning models include the instructions which, when executed by the one or more processors, cause the one or more processors to:
- apply a convolutional layer to the spectral image to extract local features of the gamma spectrum; and
- apply a pooling layer to the spectral image to extract global features of the gamma spectrum.

15. The system of claim 11, wherein the instructions to extract the one or more features of the gamma spectrum from the spectral image through the one or more machine learning models include the instructions which, when executed by the one or more processors, cause the one or more processors to:
- extract local features of the gamma spectrum from the spectral image;
- extract global features of the gamma spectrum from the spectral image; and
- identify the one or more features of the gamma spectrum based on both the local features of the gamma spectrum and the global features of the gamma spectrum.

16. A non-transitory computer-readable storage medium having stored therein instructions which, when executed by one or more processors, cause the one or more processors to:
- gather gamma spectrum data associated with a gamma spectrum, wherein the gamma spectrum data includes an energy channel and a count rate for gamma rays detected by one or more gamma detectors;
- construct a spectral image based on the gamma spectrum data;
- train one or more machine learning models based on the spectral image; and
- extract one or more features of the gamma spectrum from the spectral image through the one or more machine learning models.

17. The non-transitory computer-readable storage medium of claim 16, wherein the spectral image is a pixelated image, wherein a location of a pixel corresponds to the energy channel and a brightness of the pixel corresponds to the count rate.

18. The non-transitory computer-readable storage medium of claim 16, wherein the one or more machine learning models is a convolutional neural network.

19. The non-transitory computer-readable storage medium of claim 18, wherein the instructions to train the one or more machine learning models include the instructions which, when executed by the one or more processors, cause the one or more processors to:
- apply a convolutional layer to the spectral image to extract local features of the gamma spectrum; and
- apply a pooling layer to the spectral image to extract global features of the gamma spectrum.

20. The non-transitory computer-readable storage medium of claim 16, wherein the instructions to extract the one or more features of the gamma spectrum from the spectral image through the one or more machine learning models include the instructions which, when executed by the one or more processors, cause the one or more processors to:
- extract local features of the gamma spectrum from the spectral image;
- extract global features of the gamma spectrum from the spectral image; and
- identify the one or more features of the gamma spectrum based on both the local features of the gamma spectrum and the global features of the gamma spectrum.

* * * * *